United States Patent
Piwonka et al.

(10) Patent No.: US 7,552,475 B2
(45) Date of Patent: Jun. 23, 2009

(54) SYSTEMS AND METHODS FOR SECURING PORTS

(75) Inventors: Mark A. Piwonka, Tomball, TX (US); Edward M. Reynolds, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 869 days.

(21) Appl. No.: 10/821,746

(22) Filed: Apr. 9, 2004

(65) Prior Publication Data

US 2005/0229249 A1 Oct. 13, 2005

(51) Int. Cl.
*H04L 29/10* (2006.01)
(52) U.S. Cl. .......................................... 726/22; 726/34
(58) Field of Classification Search .............. 726/22–23, 726/34–36
See application file for complete search history.

(56) References Cited

U.S. PATENT DOCUMENTS

2002/0116604 A1* 8/2002 Thayer ........................ 713/1
2005/0010811 A1* 1/2005 Zimmer et al. .............. 713/201

OTHER PUBLICATIONS

"Enhanced Host Controller Interface Specification for Universal Serial Bus"; revision 1.0; Intel Corporation, Mar. 12, 2002, pp. 1-17.
"HP Netserver LH 6000/r and LT 6000r—USB Port Enabled May Cause Unpredictable Behavior"; Hewlett-Packard Company; Feb. 18, 2004.
"Compaq Evo N600c Notebook—Configuring the BOIS";Hewlett-Packard Company; Feb. 18, 2004.
"Disable USB Ports to prevent unauthorized data transfers"; James Detwiler; Tech Republic, Jan. 16, 2003.

* cited by examiner

*Primary Examiner*—Gilberto Barron, Jr.
*Assistant Examiner*—Venkat Perungavoor (57) ABSTRACT

Systems, methodologies, media, and other embodiments associated with securing ports are described. One exemplary system embodiment includes a configuration logic configured to provide a security option for securing one or more selected ports. The example system may also include a security logic configured to, in response to the security option being selected, cause a data store to be modified by changing a port count to specify a fewer number of physical ports to cause an operating system to not detect the one or more selected ports.

30 Claims, 5 Drawing Sheets

SYSTEMS AND METHODS FOR SECURING PORTS

BACKGROUND

Computing devices such as a computer, sometimes include one or more ports that allow a peripheral device to be connected to the computer. One type of port is a universal serial bus (USB) port that allows connection with other USB devices like a keyboard, mouse, video monitor, disk drives, memories, and the like. A computing device may include ports on its front side and its back side. In public environments such as libraries or shopping centers, it may be desirable to secure the front port(s) of a computing device to prohibit user access and to protect against data theft, viruses, and/or other situations that may occur through unauthorized user access.

Some prior systems attempted to secure the front ports by turning off power to the ports. This required additional circuitry in the system and added additional costs. Furthermore, even though the ports did not function, the operating system was able to detect the front ports and configure them, thereby allowing a self-powered device to function with the ports.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

As used in this application, the term "computer component" refers to a computer-related entity, either hardware, firmware, software, a combination thereof, or software in execution. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks and so on. Volatile media may include, for example, optical or magnetic disks, dynamic memory and the like. Common forms of a computer-readable medium include, but are not limited to, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, CMOS memory, and so on. A data store may reside in one logical and/or physical entity and/or may be distributed between two or more logical and/or physical entities.

"Logic", as used herein, includes but is not limited to hardware, firmware, software stored on a computer-readable medium and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software stored on a computer-readable medium. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a web server to a user. In another example, the computer-readable medium has a form of the software/firmware as it is maintained on the web server. Other forms may also be used.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Figure 1:
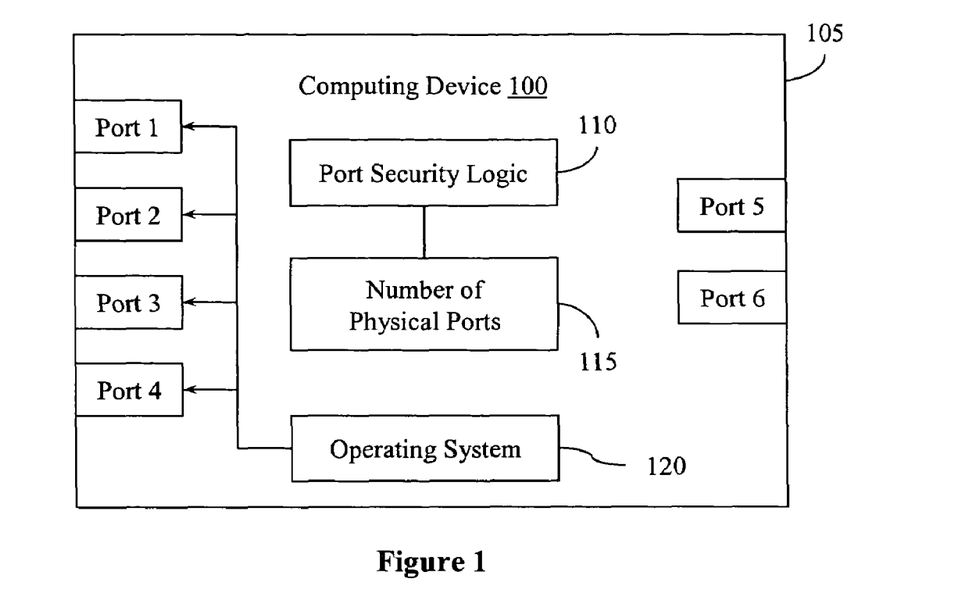
FIG. 1 illustrates an example system for securing a port in a computing device.

Illustrated in FIG. 1 is an example system for securing one or more ports of a computing device 100. The computing device 100 may be a data processing device like a computer, a portable computing device, an image forming device, and the like. The computing device 100 can be configured with one or more ports (e.g. ports 1-6) that allow peripheral devices to be connected to the computing device 100. In one example, the ports 1-6 can be universal serial bus (USB) ports and may be positioned on different sides of a housing 105 of the computing device 100. For example, ports 14 can be configured as back ports that are positioned on the rear side of the computing device 100 and ports 5-6 can be configured as front ports positioned on a front side of the computing device 100. In one example where the computing device 100 is configured as a kiosk that is to be positioned in a public area and used by many users, it may be desirable to secure the front ports (e.g. port 5 and 6) so as to prohibit access to the computing device 100 through the front ports.

To secure the front ports, a port security logic 105 can be provided to secure the front ports of the computing device 100 by, for example, causing the selected ports to be inoperable to prevent user access. In one example, the computing device 100 can include a data store 115 that is configured to store a value such as a port count that specifies the number of physical ports that are present in the computing device 100. The data store 110 can be used by, for example, an operating system 120 to detect and identify the ports during an enumeration process that are present in the computing device 100. Ports that are enumerated by the operating system 120 can be configured for operation while ports that are not enumerated are in effect, hidden from the operating system and cannot be configured for operation. Non-configured ports, thus, become inoperable. Once the ports are inoperable, a user is prohibited from gaining access to the computing device 100 by plugging in an external device into the front ports. Even self-powered devices will not function with the computing device 100 since no operable connection exists between the front ports (e.g. port 5 and 6) and the operating system 120 or other computer components within the computing device 100.

The port security logic 110 can be configured to cause the data store 115 to be modified by changing the port count to specify a fewer number of physical ports to cause the operating system 120 to not detect the one or more selected ports. In this manner, the operating system 120 is made to believe that the computing device 100 includes a number of ports that is less than the actual number of port. Modifying the value in the data store 115 can be performed in response to a security option/setting being selected. For example, the port security logic 110 can include and/or function with a configuration logic (not shown) that is configured to provide the security option on a display that specifies whether a selected port is to be secure or not. This may be in a form such as changeable configuration parameters displayed by a graphical user interface that cause configuration settings to be modified in non-volatile memory by the port security logic 110. Additional measures may be implemented to protect the configuration settings of the front ports. For example, access into configuration software such as a system set-up routine can be protected with passwords or other security measures to restrict unauthorized access.

Figure 2:
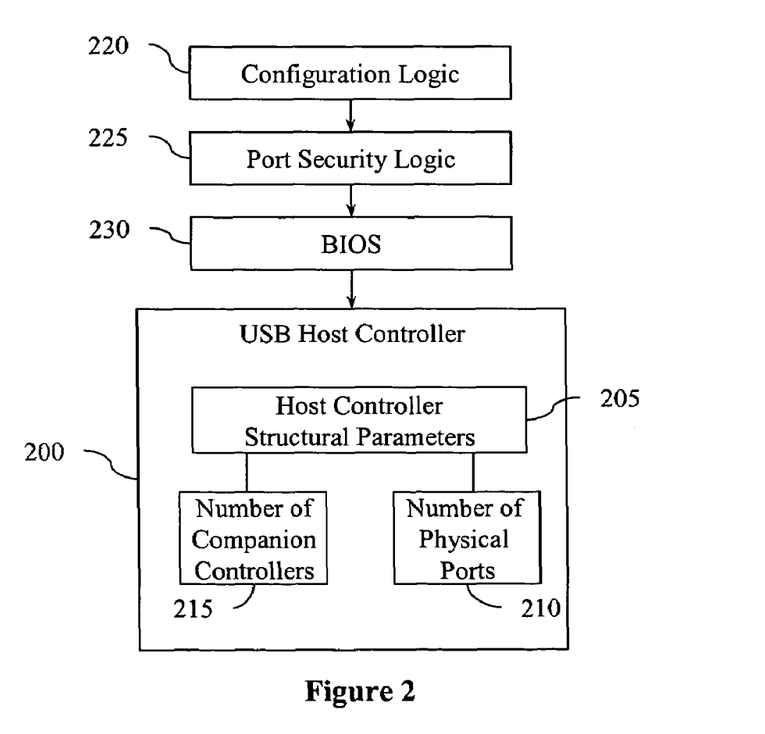
FIG. 2 illustrates another example of a port security system for securing ports.

Illustrated in FIG. 2 is another example of a port security system that can be implemented for a computing device. In the following example, the computing device will be described as having one or more physical ports (not shown) that are present in the computing device and where a universal serial bus (USB) host controller 200 is configured to control the one or more ports. The USB host controller 200 will be described as a USB version 2.0 host controller but it will be appreciated that other types of host controllers may be used with the present port security system. A more detailed example of a USB 2.0 host controller will be described with reference to FIG. 3.

With further reference to FIG. 2, the USB host controller 200 includes one or more data stores that are configured to contain configuration parameters for the host controller. For example, host controller structural parameters 205 include a set of fields that define structural parameters in accordance with the USB specification. The parameters 205 may be defined in a register and include a field that specifies the number of physical ports 210 that are implemented on the host controller 200 and thus, specifies the number of physical ports present in the computing device. The value of the field 210 determines how many port registers are addressable in the Operational Register Space that is configured by the operating system. The operating system, thus, looks to the structural parameters 205 to determine how many ports to configure. The host controller structural parameters 205 can be based on Enhanced Host Controller Interface (EHCI) Specification for Universal Serial Bus which describes the register-level interface for a host controller for the universal serial bus revision 2.0.

Additionally, the host controller structural parameters 205 include a field that specifies the number of companion controllers 215 that are associated with the host controller 200. The companion controllers include zero (0) or more USB 1.1 companion host controllers which may also be present and will be described in greater detail with reference to FIG. 3. In general, the operating system is configured to read the host controller structural parameters 205 to determine the ports and controllers that are present in order to properly configure the system as it does for other USB devices. For example, when the operating system performs an enumeration process, the operating system will read the host controller structural parameters 205 to determine the number of physical ports to enumerate. Ports that are not enumerated are not assigned system resources such as input/output (I/O) and memory and thus are inoperable. Furthermore, ports that are not enumerated by the operating system are not detected by the operating system so they are hidden devices. For example, when the operating system scans a peripheral component interconnect (PCI) bus to look for devices, a device that does not respond appears as an empty device or a non-existent device. This is slightly different than a "disabled" device. For example, a device like a port, can have a configuration parameter set as a "disabled" device causing the device to not be configured. However, the disabled device is still visible to the operating system. In other words, the operating system is aware of the device but does not configure it.

With further reference to FIG. 2, to provide a means for securing one or more ports of a computing device, a configuration logic 220 and a port security logic 225 can be provided. For example, the configuration logic 220 can be configured to provide a security option for securing one or more selected ports. For example, the configuration logic 220 can be part of a graphical user interface that displays port settings, parameters, and/or other configuration options for the ports that are present in the system. One type of security option may include an option that switches a port between an available state and a hidden state. The "available" state could represent a configuration where the port is available for use and operates in a standard manner. The "hidden" state could represent a configuration where the port is made to be hidden from the operating system so that the port is not available for use and thus, secured.

When one or more ports are selected to have a secured state, one or more signals can be transmitted to the port security logic 225 that indicate the secured state. In response to the signal(s), the port security logic 225 is configured to cause the number of physical ports 210 to be modified. The modification can be performed, for example, through the basic input/output system (BIOS) 230 that provides access to configuration settings that are in non-volatile memory like CMOS memory. For example, if the computing device includes six physically present ports where four ports are positioned in the back of the system and two ports are positioned as front ports, the configuration logic 220 can provide a security option to secure the front two ports. As such, the number of physical ports 210 would initially be configured with a value representing six ports. However, in response to the two front ports being set as secured ports, the value in the data store representing the number of physical ports 210 would be reduced by the number of secured ports (e.g. reduced by two ports) thus, changing the initial value of six ports to a value of four ports. As a result, the operating system will be caused to enumerate only four ports even though six ports are actually physically present and two ports will not be operable.

It will also be appreciated that according to current USB specifications, ports are numbered in increasing order from a value of one and up. Additionally, back ports are assigned port numbers first and then front ports are assigned port numbers, if the front ports exist. For example, in the above-described configuration having four back ports and two front ports, the back ports will receive port numbers 1-4 and the two front ports will be assigned port numbers 5 and 6. Based on this numbering scheme, by reducing the number of physical ports stored in data store 210 by two, this will cause the operating system to be aware of a number of physical ports (e.g. four ports) that is less than the total number of physical ports present (e.g. six ports). The operating system will enumerate the back ports since they are port numbers 1-4 and will not enumerate the front ports because the operating system will stop enumeration at port 4. Furthermore, due to the port numbering scheme, the front ports can be secured without having special or individual configuration settings associated with the ports to make them secure. Rather, the number of physical ports 210 is simply reduced to hide selected ports from the operating system.

If companion controllers are present in the USB host controller 200, the structural parameters 205 may include a value for the number of companion controllers 215. The companion controllers may include USB version 1.1 controllers that are associated to selected ports within the system. This will be described in greater detail with reference to FIG. 3. If the port security logic 225 causes the number of physical ports 210 to be reduced (e.g. to secure the front ports), the port security logic 225 can also cause the number of companion controllers 215 to be reduced by the number of controllers that are associated with the secured ports. For example, if one companion controller is assigned to control the two front ports and if the front ports are secured, then the number of companion controllers 215 can be reduced by a value of one. This will also cause the operating system not to enumerate one companion controller.

Figure 3:
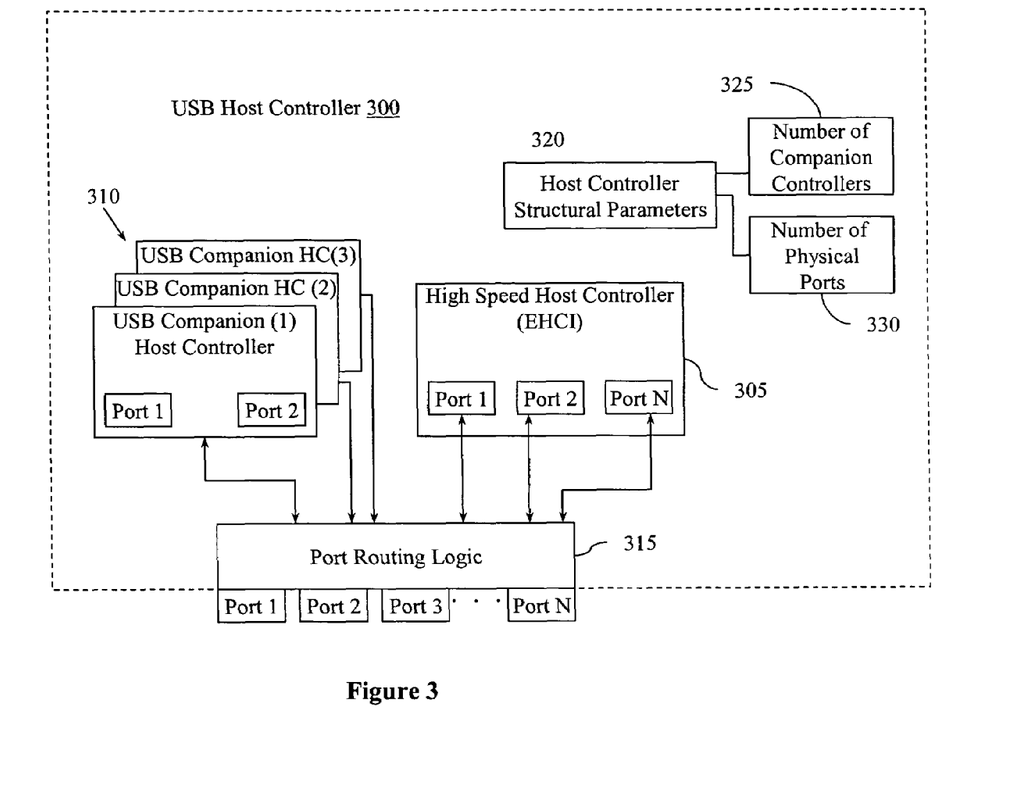
FIG. 3 illustrates an example component diagram of a USB host controller.

Illustrated in FIG. 3 is an example diagram of a USB version 2.0 host controller 300 including a logical representation of selected components therein. Based on the USB 2.0 specification, the host controller 300 includes one high-speed mode host controller 305 and 0 or more USB version 1.1 host controllers 310. The high-speed host controller 305 implements an enhanced host controller interface (EHCI) that is configured for high-speed communications with high-speed-mode devices that can be connected to the ports of the USB 2.0 host controller 300 (e.g. port 1-N). The version 2.0 specification provides for communications with full-speed and low-speed devices that may also be connected to the ports 1-N which is controlled by the USB companion host controllers 310. If the host controller 300 is not configured with companion host controllers 310 then operation with a full-speed or low-speed device is not provided.

The USB 1.1 companion controllers 310 can be configured to control one or more ports. For example, each companion controller 310 can be configured to control two ports so that as shown in FIG. 3, companion controller (1) is associated with and controls port 1 and port 2, companion controller (2) controls port 3 and 4, and companion controller (3) controls ports 5 and 6, assuming that six ports are present. The high-speed host controller 305 includes one controller that controls high-speed operations with all of the present ports 1-N. The host controller 300 can operate with a plurality of devices that can be connected to the ports 1-N. Based on the speed of the device that is connected to a port, a port routing logic 315 configures the connected port to operate with either the companion host controller 310 or the high-speed host controller 305.

The USB host controller 300 includes a set of host controller structural parameters 320 that are stored in a data store such as a register. The structural parameters 320 are identified as HCSPARAMS in the Enhanced Host Controller Interface Specification for Universal Serial Bus revision 1.0. The structural parameters include for example a field for the number of companion controllers 325 and a field for the number of physical ports 330. The number of companion controllers 325 is stored in the field identified as N_CC and the number of physical ports field 330 is identified as the N_PORTS field. Using the previous example, if the number of physical ports is six, and each companion host controller is associated with two ports, meaning that three companion controllers are present, the number of physical ports 330 would specify a value of six and the number of companion controllers 325 would specify a value of three.

Furthermore, assume that the back ports are ports 1-4 and the front ports are ports 5 and 6. Then, front ports can be secured by reducing the number of physical ports field 330 by a value of two as described in previous examples. Additionally, the number of companion controllers field 325 can be reduced by one representing the one controller that is associated to the two front ports. Thus, when the operating system performs an enumeration process, the operating system will read the host controller structural parameters 320 and determine that only four physical ports exist and two companion controllers exist and will only enumerate those components. As a result, the two front ports will not be enumerated and the system will not be aware that the front ports are present. The front ports will be secured because they will not be configured for operation. This may also be preformed at boot and/or run-time where PCI auto-configuration software scans the PCI configuration space in search of PCI devices (which include USB ports). When a device is detected, the operating system becomes aware of the device and the device is allocated PCI memory and/or I/O space. If a device is not detected, the device is not allocated system resources and will not function with other components. By reducing the number of physical ports 330, the scan will not look for additional ports above the stored number even though additional ports may exist.

Figure 4:
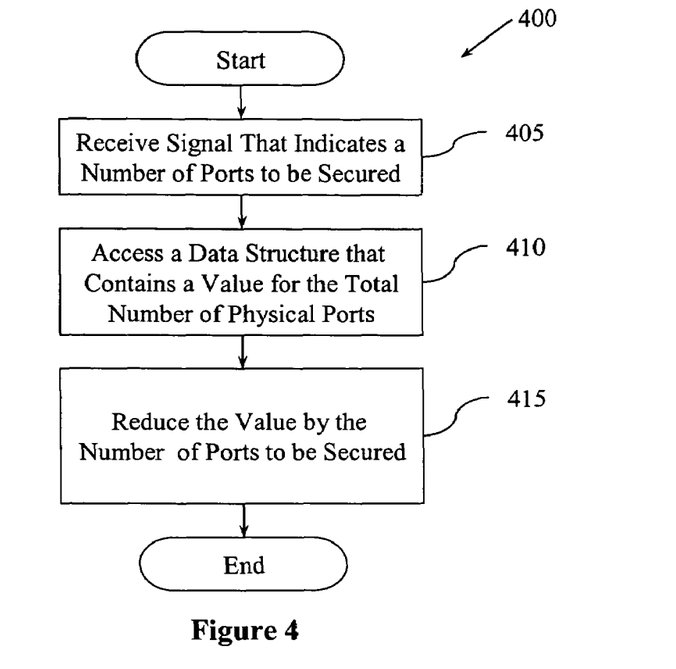
FIG. 4 illustrates an example methodology associated with securing a port.

Example methods may be better appreciated with reference to the flow diagram of FIG. 4. While for purposes of simplicity of explanation, the illustrated methodologies are shown and described as a series of blocks, it is to be appreciated that the methodologies are not limited by the order of the blocks, as some blocks can occur in different orders and/or occur concurrently with other blocks from that shown and described. Moreover, less than all the illustrated blocks may be required to implement an example methodology. Furthermore, additional and/or alternative methodologies can employ additional, not illustrated blocks.

In the flow diagrams, blocks denote "processing blocks" that may be implemented with logic. In the case where the logic may be software, a flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on are not shown. It will be further appreciated that electronic and software logic may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques. The foregoing applies to all methodologies herein. It will be appreciated that in one example, methodologies, logic, and other means described herein and their equivalents can be implemented as processor executable instructions and/or operations provided by or stored on a computer-readable medium.

With reference to FIG. 4, an example methodology is shown that can be associated with a process for securing ports in a computing device. The methodology 400 can be performed, for example, during a ROM-based setup process, or other type of system configuration software/firmware configuration routine. The methodology 400 can initiate, for example, in response to a signal being received that indicates a number of ports to be secured (block 405). Such a signal can be received from a user-selected option that selects one or more ports to be secured. As previously described, one security option can be to secure the front ports of a computing device to prohibit users from accessing the ports.

The methodology 400 assumes that a data store is used that contains a value specifying the total number of physical ports present in a system. The data store is then accessed (block 410) and the value is reduced by the number of ports to be secured (block 415). For example, if the two front ports are to be secured from a total number of six physical ports, the value would be reduced by two to change the original value of six to now be a value of four. Changing the value will cause an operating system to be aware of a number of physical ports that is less than the actual total number of physical ports (e.g. six). As a result, the operating system will not enumerate two ports out of the six total ports and those two ports will not be operable.

The methodology 400 can optionally include providing an option to a user to secure a port where in response to the option being selected, the signal from block 405 is generated that indicates the number of ports to be secured. The methodology 400 may be useful, for example, for a computing device that is configured as a kiosk to be used in a public environment. The computing device may have a total number of physical ports that includes one or more front ports positioned on the device that are accessible by a user and one or more back ports that are positioned in the rear of the device. In a kiosk, the back ports can be more easily protected from user access since the device can be in a separate housing where the rear of the computing device is covered. However, the front ports, due to their location, are much more easily accessible to a user. In this example, the reducing block 415 represents reducing the value by the number of front ports to cause the operating system to not enumerate the front ports.

If the data store that contains the value of the total number of ports in a write-protected non-volatile memory, the methodology 400 can include enabling the data store to be writable. Then the value in the data store can be modified to specify the number of physical ports that is less than the total number of physical ports (e.g. four ports instead of six ports). The data store can then be enabled back to be write-protected, or otherwise a read-only state.

If a computing device includes a host controller configuration as shown in FIG. 2 or 3, which may include companion controllers, the methodology 400 can further include storing a controller value (e.g. the number of companion controllers 215, 325), that specifies a number of controllers present in the device that are configured to control the physical ports. The controller value can then be reduced by the number of controllers that are associated with the front ports to cause the operating system to not enumerate the controllers that are associated with the front ports.

Figure 5:
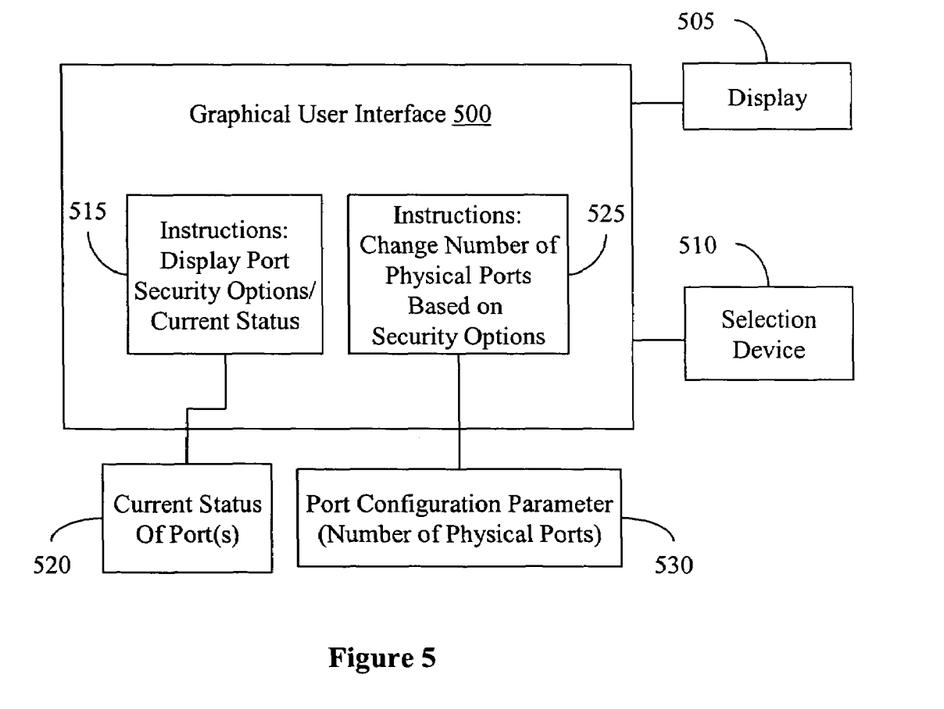
FIG. 5 illustrates an example graphical user interface that can be associated with securing a port.

Illustrated in FIG. 5 is an example graphical user interface 500 that can be associated with securing selected ports of a computing device. The graphical user interface 500 can be provided by a computer-readable medium including processor executable instructions that cause a computing device to secure selected ports from operation. It will be appreciated that the example graphical user interface 500 can be a means to implement previous example systems and methods like the port security logic 110 from FIG. 1, and/or the configuration logic 220 and port security logic 225 from FIG. 2.

An example computing device can include at least a display 505 and a selection device 510 that can interface and operate with the graphical user interface 500. The graphical user interface 500 can be embodied as software/firmware on a computer-readable medium having processor executable instructions operable to perform a method of providing and selecting from a set of data entries on the display 505 to change a security status of selected ports.

The graphical user interface 500 can include executable instructions 515 that cause port security options and/or a current port security status of each port present in the device to be displayed on the display 505. The security options/current security status can be retrieved from one or more data entries that are maintained as a current status of each port 520. For example, the port security options/current security status may include an available status and a hidden status where the available status represents a standard operating mode for a port while a hidden status represents a secured or inoperable operation mode for a port. The security options/current status 520 can be made to be changeable by a user through the use of the selection device 510 where the selection device 510 causes a data entry selection signal to be received by the graphical user interface 500 that is indicative of the selection device 510 selecting one or more data entries (e.g. setting the security status 515) that modifies the security status of a selected port.

In response to the data entry selection signal, an operation can be initiated that causes a configuration parameter to be modified in accordance with the displayed security status 515 where the configuration parameter stores a value that specifies a total number of physical ports that are present in the computing system. Thus, the graphical user interface 500 can include executable instructions 525 that cause the number of physical ports to be changed based on the security status 515. The instructions 525 can cause a port configuration parameter 530, which is configured to specify the number of physical ports, to be reduced in response to the security status for a selected port being set to indicate a secured status. For example, if the port configuration parameter 530 specifies eight actual physical ports being present in a system and two ports are selected to be secure (e.g. the two front ports), the port configuration parameter 530 is reduced by two to now specify a value of six.

As explained in previous examples, changing a configuration parameter to a fewer number of actual physical ports can cause an operating system not to enumerate the selected port(s). Also in accordance with previous examples, the port configuration parameter 530 can be configured as part of a host controller structural parameter that is associated with a host controller that provides an interface to one or more ports in the computing system. The structural parameter can be based on the USB 2.0 specification where the ports are universal serial bus ports. The configuration parameter 530, as well as the number of physical ports 210 shown in FIG. 2 and value 330 shown in FIG. 3, can be regarded as a port count that specifies the number of physical ports present in a device.

Figure 6:
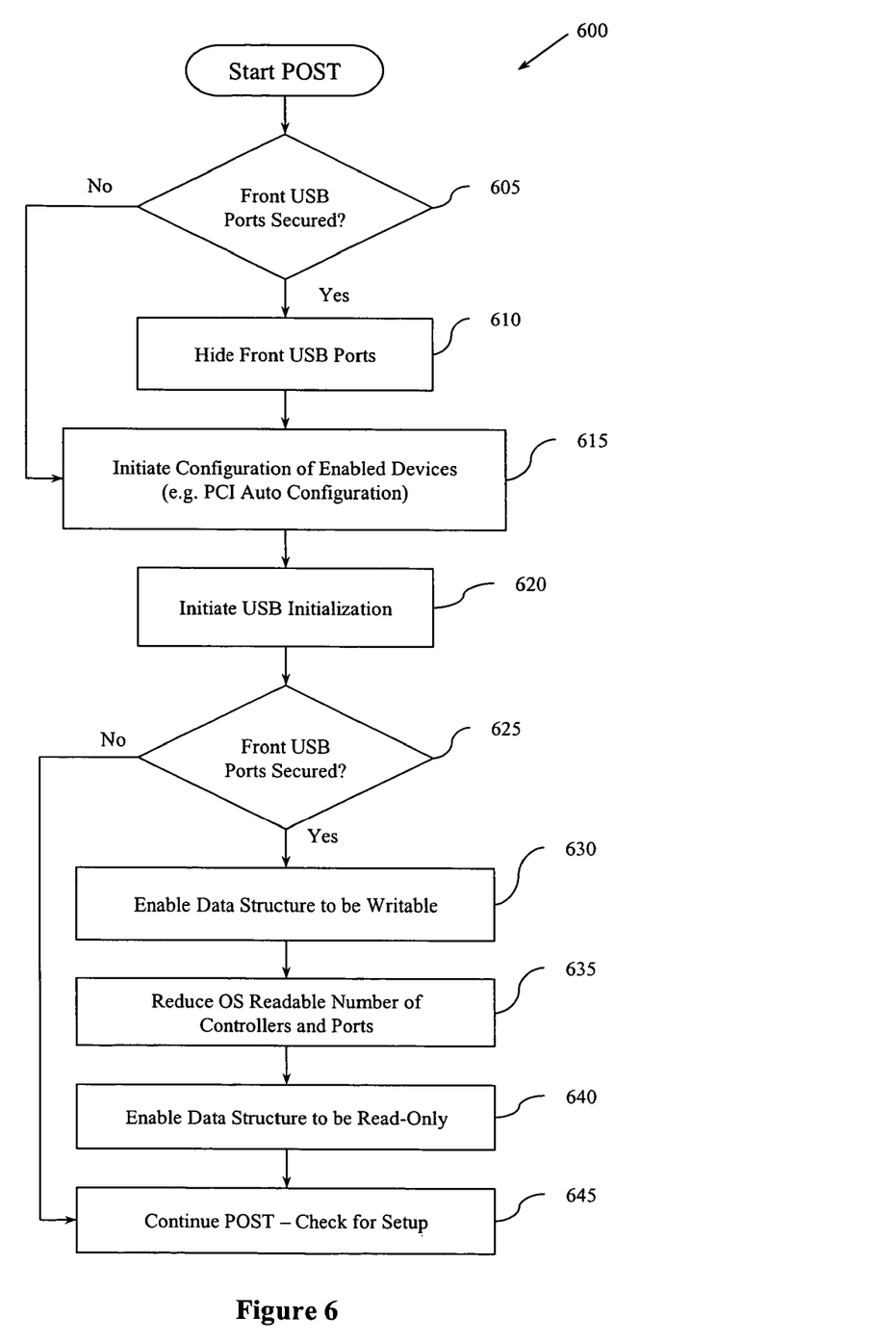
FIG. 6 illustrates an example methodology that can be associated with a system self-test/configuration process.

With reference to FIG. 6, an example methodology 600 is illustrated that can be associated with a configuration process of a computing device like a power-on self test (POST). It will be appreciated that a POST process can include testing and configuration of many different types of components. However, the methodology 600 will be described with reference to the configuration of USB ports including back ports and front ports and whether the front ports are secured or not.

After the initiation of the methodology 600, a determination is made whether the front USB ports are enabled (Block 605). For example, this determination can be made in response to a user changing a security option for the front USB ports to be secured or not secured. If the front ports are selected to be secured, then a parameter is set to hide the front USB ports (Block 610). If at Block 605 the front ports are not secured, meaning they will operate as normal, the process continues at block 615 where configuration of enabled devices is initiated. This may include, for example, a peripheral component interconnect (PCI) auto-configuration process. The process may then initiate USB initialization of enabled devices (Block 620).

If at determination block 625 the front USB ports were designated to be secured, flow goes to block 630 in order to reconfigure the system to secure the front ports. For example, as described in a previous example, a data store can be included that specifies a value(s) indicating the total number of physical ports and number of controllers, if configured as such. This value is read and used by the operating system to determine which ports to enumerate. At Block 630, the data store is enabled to be writable. The operating system-readable number of controllers and ports are then reduced by the number of front ports that are secured (Block 635). For example, if the total number of ports initially is six ports and there are two front ports that are to be secured, the number of ports is reconfigured to be four ports. Likewise, if there is one USB controller for every two ports, then one controller is subtracted from the value that specifies the total number of controllers. Once modified, the data store is then enabled to be read-only (Block 640). The POST process then continues which may include, for example, a checking for a setup key to be pressed that can initiate a user-configurable system setup procedure such as an F-10 setup (Block 645).

Figure 7:
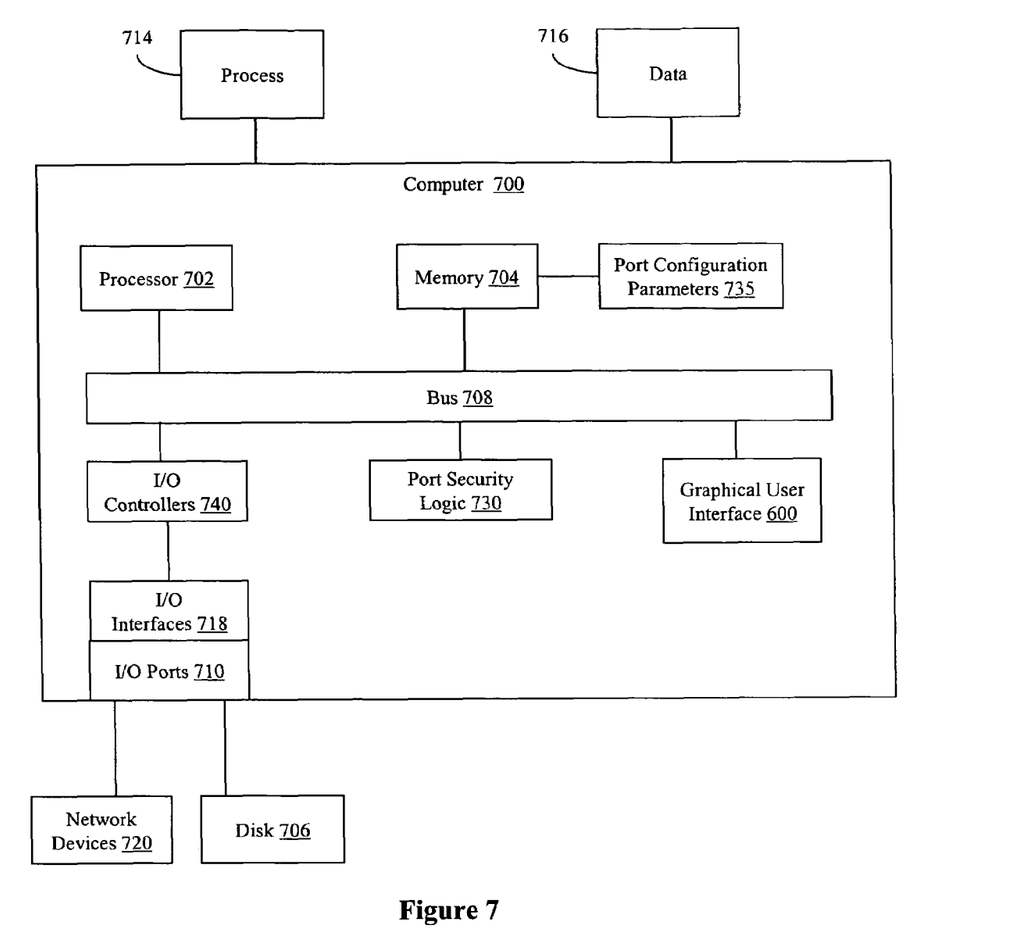
FIG. 7 illustrates an example computing device in which example systems and methods described herein, and equivalents, can operate.

FIG. 7 illustrates an example computing device in which example systems and methods described herein, and equivalents, can operate. The example computing device may be a computer 700 that includes a processor 702, a memory 704, and input/output ports 710 operably connected by a bus 708. In one example, the computer 700 may include a port security logic 730 configured to facilitate securing selected ports like the front USB ports. The port security logic 730 can be implemented similar to the port security logic 110, 225 described in FIGS. 1 and 2, respectively, and/or the other systems and methods described herein. The computer 700 can provide the graphical user interface 600 that is described with reference to FIG. 6 that allows a user to select security options for selected ports, and that causes port configuration parameters 735, stored in the memory 704, to be reconfigured accordingly. The port configuration parameters 735 can be, for example, the host controller structural parameters 205, 320 described with reference to FIGS. 2 and 3, respectively, or other types of parameters that facilitate configuration of ports.

Generally describing an example configuration of the computer 700, the processor 702 can be a variety of various processors including dual microprocessor and other multiprocessor architectures. The memory 704 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 706, and/or other peripheral devices, may be operably connected to the computer 700 via, for example, an input/output interface (e.g., card, device) 718 and one or more input/output ports 710. The disk 706 can include, but is not limited to, devices like a magnetic disk drive, a solid state disk drive, a floppy disk drive, a tape drive, a Zip drive, a flash memory card, and/or a memory stick. Furthermore, the disk 706 can include optical drives like a CD-ROM, a CD recordable drive (CD-R drive), a CD rewriteable drive (CD-RW drive), and/or a digital video ROM drive (DVD ROM). The memory 704 can store processes 714 and/or data 716, for example. The disk 706 and/or memory 704 can store an operating system that controls and allocates resources of the computer 700. The disk 706 may be an internal storage device.

The bus 708 can be a single internal bus interconnect architecture and/or other bus or mesh architectures. While a single bus is illustrated, it is to be appreciated that a computer 700 may communicate with various devices, logics, and peripherals using other busses that are not illustrated (e.g., PCIE, SATA, Infiniband, 1394, USB, Ethernet). The bus 708 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 700 may interact with input/output devices via one or more I/O controllers 740, the I/O interfaces 718, and input/output ports 710. The I/O controllers 740 can be configured to control devices connected to the ports 710. The I/O controller 740 can be, for example, a USB host controller as described previously. Input/output devices can include, but are not limited to, a keyboard, a microphone, a pointing and selection device, cameras, memories, video cards, displays, disk 706, network devices 720, and the like. The input/output ports 710 can include but are not limited to, serial ports, parallel ports, and USB ports. As previously described, by hiding the front ports of the computer 700 using the port security logic 730, operable connections with the front ports can be prohibited. Thus, a user will be prevented from accessing the computer 700 through the front ports.

The computer 700 can operate in a network environment and thus may be connected to network devices 720 via the I/O interfaces 718, and/or the I/O ports 710. Through the network devices 720, the computer 700 may interact with a network. Through the network, the computer 700 may be logically connected to remote computers. The networks with which the computer 700 may interact include, but are not limited to, a local area network (LAN), a wide area network (WAN), and other networks. The network devices 720 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 720 can connect to WAN technologies including, but not limited to, point to point links, circuit switching networks like integrated services digital networks (ISDN), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system for securing one or more ports of a computing device that includes an actual number of physical ports and a data store that contains a port count specifying the actual number of physical ports, the system comprising:
- a configuration logic configured to provide a security option for securing one or more selected ports; and
- a security logic configured to, in response to the security option being selected, cause the data store to be modified by changing the port count to specify a fewer number of physical ports to cause an operating system to not detect the one or more selected ports.

2. The system of claim 1 where the security logic is configured to access the data store that includes a register configured to store host controller structural parameters based on an enhanced host controller interface specification.

3. The system of claim 2 where the port count is an N_PORTS field included within the host controller structural parameters that specifies a number of physical ports present in the computing device, the security logic being configured to cause the N_PORTS field to be modified in order to hide the one or more selected ports from the operating system.

4. The system of claim 2 where the host controller structural parameters include a companion controller field that indicates a number of companion controllers associated with the ports, the security logic being configured to cause the companion controller field to be reduced by a number to cause the operating system to be unaware of one or more of the companion controllers.

5. The system of claim 1 where the data store includes a register configured to be read by the operating system during an enumeration process to determine the number of physical ports to enumerate, where the one or more selected ports are not enumerated by the operating system.

6. The system of claim 5 where the number of physical ports indicated in the data store cause the operating system to enumerate a fewer number of ports than the actual number of physical ports.

7. The system of claim 1 where the system configuration logic includes a graphical user interface.

8. The system of claim 1 where the system is embodied as a computer-readable medium configured to provide the system configuration logic and the security logic as processor executable instructions.

9. The system of claim 1 where the one or more selected ports are front ports of the computing device.

10. A computing system, comprising:
- a housing;
- one or more processors;
- a set of physical ports including:
  - one or more front ports positioned on the housing and being accessible by a user to connect an external device to the computing system; and
  - one or more back ports, positioned on the housing, being configured to connect an external device to the computing system;
- a structural parameter configured to indicate a total number of physical ports that are present in the computing system including the one or more front ports and the one or more back ports, the structural parameter being configured to indicate a fewer number of ports than the total number of physical ports in order to prohibit operation of the one or more front ports; and
- an operating system configured to enumerate ports that are present in the computing system based on the structural parameter, the structural parameter causing the one or more front ports to be undetectable by the operating system causing the one or more front ports to be inoperable.

11. The computing system of claim 10 where the fewer number of ports indicated in the structural parameter causes the operating system to not enumerate the one or more front ports so that no operable connection is established between the one or more front ports and the operating system.

12. The computing system of claim 10 where the one or more front ports are logically numbered with greater port numbers than the one or more back ports, and where the operating system is configured to enumerate ports from a lowest to highest port number.

13. The computing system of claim 10 where the structural parameter is a data stored configured to contain a plurality of configuration parameters.

14. The computing system of claim 10 where the set of physical ports are universal serial bus (USB) ports and where the computing system further includes:
- a high speed host controller configured to control selected ports of the set of physical ports at a first communication speed;
- one or more companion controllers configured to control selected ports of the set of physical ports at one or more communication speeds that are different than the first communication speed; and
- a companion controller field configured to specify a number of actual companion controllers where the companion controller field being modified to specify a fewer number of companion controllers than the number of actual companion controllers to account for the one or more front ports being undetected by the operating system.

15. The computing system of claim 10 further including:
- a graphical user interface configured to allow a user to select the one or more front ports to be inoperable or operable; and
- a port security logic configured to reconfigure the structural parameter to modify the total number of physical ports stored therein in response to the one or more front ports being selected to be inoperable or operable.

16. A method for securing a port in a device having a total number of physical ports, the method comprising:
- receiving a signal that indicates a number of ports to be secured from user access;
- accessing a data store that contains a value for the total number of physical ports; and
- reducing the value in the data store by the number of ports to be secured to cause an operating system to be aware of a number of physical ports that is less than the total number of physical ports.

17. The method of claim 16 further including:
- providing an option to a user to secure a port; and
- in response to the option being selected, generating the signal that indicates the number of ports to be secured.

18. The method of claim 16 where the total number of physical ports include one or more front ports positioned on the device and being accessible by a user, and one or more back ports positioned on the housing, and where the signal indicates to secure the one or more front ports; and
- where the reducing step includes reducing the value by the number of the one more front ports to cause the operating system to not enumerate the one or more front ports.

19. The method of claim 18 further including:
- storing a controller value that specifies a number of controllers present in the device that are configured to control the physical ports; and
- reducing the controller value by a number of controllers that are associated with the one or more front ports to cause the operating system to not enumerate the controllers that are associated with the one or more front ports.

20. The method of claim 18 where the reducing step includes:
enabling the data store to be writeable;
modifying the value in the data store to specify the number of physical ports that is less than the total number of physical ports; and
enabling the data store to be read-only.

21. A computer-readable medium for providing processor executable instructions operable to perform a method, the method comprising:
providing a security option to secure one or more ports of a device;
in response to the security option being selected for a port, specifying a reduced number of physical ports that is less than an actual number of physical ports present in the device; and
changing a configuration parameter that indicates, to an operating system, the actual number physical ports, where the configuration parameter is changed to indicate the reduced number of physical ports causing the operating system not to enumerate the one or more ports.

22. The computer-readable medium of claim 21 where changing the configuration parameter to the reduced number of physical ports causes no operable connection to be established between the one or more ports and the operating system.

23. The computer-readable medium of claim 21 further including processor executable instructions to cause a processor to:
enable the configuration parameter to be writeable;
change the configuration parameter to indicate the reduced number of physical ports; and
enabling the configuration parameter to be read-only.

24. The computer-readable medium of claim 21 where the configuration parameter includes a host controller structural parameter associated with a universal serial bus controller.

25. A system, comprising:
port configuration means for selecting a port to be secured from a set of physical ports configured within a computing device; and
security means for causing an operating system to not enumerate the selected port to cause the selected port to be inoperable, including modifying a port count to specify one less port than a total number of the set of physical ports where the operating system enumerates ports based on the port count.

26. The system of claim 25 where the security means is further configured to modify the port count by one or more values.

27. In a computer system having a graphical user interface comprising a display and a selection device, a method of providing and selecting from a set of data entries on the display, the method comprising:
retrieving a one or more data entries, where a data entry represents a security status of a port;
displaying the one or more data entries on the display to show the security status and allow the security status to be modified;
receiving a data entry selection signal indicative of the selection device selecting one or more of the data entries that modifies the security status of a port; and
in response to the data entry selection signal, initiating an operation that causes a configuration parameter to be modified in accordance with the security status where the configuration parameter stores a value that specifies a total number of physical ports that are present in the computer system, the operation causing the value to be reduced in response to the security status for a selected port being set to indicate a secured status to cause an operating system not to enumerate the selected port.

28. The graphical user interface of claim 27 where the security status includes an available status and a hidden status.

29. The graphical user interface of claim 27 where the configuration parameter is configured as part of a host controller structural parameter associated with a host controller that provides an interface to one or more ports in the computer system.

30. The graphical user interface of claim 29 where the one or more ports are universal serial ports.

* * * * *

UNITED STATES PATENT AND TRADEMARK OFFICE
CERTIFICATE OF CORRECTION

| | | |
|---|---|---|
| PATENT NO. | : 7,552,475 B2 | Page 1 of 1 |
| APPLICATION NO. | : 10/821746 | |
| DATED | : June 23, 2009 | |
| INVENTOR(S) | : Mark A. Piwonka et al. | |

It is certified that error appears in the above-identified patent and that said Letters Patent is hereby corrected as shown below:

In column 4, line 19, delete "14" and insert -- 1-4 --, therefor.

In column 14, line 60, in Claim 18, after "one" insert -- or --.

Signed and Sealed this

Twenty-fourth Day of November, 2009

David J. Kappos
*Director of the United States Patent and Trademark Office*